(12) United States Patent
Everett

(10) Patent No.: US 6,369,971 B1
(45) Date of Patent: Apr. 9, 2002

(54) PES LINEARIZATION SCHEME FOR DISK DRIVE SERVO USING SMALL EXCITATION BODE MEASUREMENTS

(75) Inventor: Timothy J. Everett, Los Gatos, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/377,426

(22) Filed: Aug. 19, 1999

(51) Int. Cl.[7] .............................................. G11B 5/596
(52) U.S. Cl. .................................. 360/77.08; 360/77.04
(58) Field of Search ......................... 360/77.04, 77.02, 360/77.08, 77.11, 78.04, 78.09, 78.14, 75

(56) References Cited

U.S. PATENT DOCUMENTS 5,940,240 A * 8/1999 Kupferman ............... 360/77.08
5,946,158 A 8/1999 Nazarian et al. ......... 360/77.04

* cited by examiner

*Primary Examiner*—Andrew L. Sniezek
(74) *Attorney, Agent, or Firm*—David M. Sigmond

(57) ABSTRACT

A PES linearization scheme using small excitation bode measurements is provided to account for non-linearity characteristics during measurements of head element positions so to generate a more accurate read and write operation by a head element of a disk drive assembly. The PES linearization scheme of this invention provides making gain measurements as the head element moves across the track, and then integrating the result to get a relative PES profile. By then finding two points on the profile a known distance apart, we can multiply the profile by the appropriate gain factor to get an absolute PES profile. This profile can be then be used as a look up table to convert raw PES numbers into actual position.

20 Claims, 7 Drawing Sheets

PES LINEARIZATION SCHEME FOR DISK DRIVE SERVO USING SMALL EXCITATION BODE MEASUREMENTS

FIELD OF INVENTION

This invention generally relates to methods of determining positions of the head element in a storage medium assembly to maximize the accuracy of a read or write operation of that head element, more particularly the invention relates to methods of measuring the non-linear relationship between measured servo burst amplitudes and head position to improve the accuracy of the servo positioning system.

BACKGROUND OF INVENTION

In a typical disk drive assembly, methods of determining head element positions to enable accurate read and write operations include having a servo writer write track and burst data information into each of various spoke regions distributed at radial intervals across each track of a disk medium. The track and burst information at each spoke region is then used to identify a corresponding radial position on that track. As illustrated in FIG. 1, a prior technique to determine a radial position of the head element on a particular track is to measure the read-back amplitude, or servo burst amplitude, and determine the amount of overlap of that measured head position (i.e., $x_m$) to a pair of servo bursts, such as burst amplitude A 14 and burst amplitude C 16. When head element 12 overlaps equally both burst amplitudes A and C, i.e., amplitude measured for burst A equals amplitude measured for burst C (A=C), head element 12 is then considered centered over that track for an accurate write operation. However, with greater use of magneto-resistive (MR) heads in disk drives, typical servo burst amplitudes no longer vary linearly with cross-track position as was more common with inductive heads. The amount of non-linearity can vary with skew angle.

Thus, if the relationship between the head position to burst amplitudes is non-linear, then error in the perceived position occurs unless the disk drive assembly accounts for that non-linearity. Correspondingly, unless this non-linearity is taken into account in calculating the head position, an increased likelihood of errors in write and read operations can occur.

Various schemes have been proposed to address the problem raised by this non-linearity including methods of determining head element positions to enable accurate read and write operations. One technique provides a three pass track servo write to use smaller, more linear regions of the cross track profile. Yet another method would be to increase the number of burst combinations used so that each combination is used across only a quarter track instead of half track to provide another approach to use a smaller, more linear region of the head profile While these methods reduce the effect of the head non-linearities, they make no attempt to compensate for them directly.

There is therefore a need for an improved method of calculating the effect of the non-linearity of head element to provide more accurately measured head position for read and write operations in disk drives.

SUMMARY OF INVENTION

A PES linearization scheme using small excitation bode measurements is provided to account for non-linearity characteristics during measurements of head element positions so to generate a more accurate read and write operation by a head element of a disk drive assembly. The PES linearization scheme of this invention provides making gain measurements as the head element moves across the track, and then integrating the result to get a relative PES profile. By then finding two points on the profile a known distance apart, we can multiply the profile by the appropriate gain factor to get an actual PES profile. This profile can be then be used as a look up table to convert raw PES numbers into actual position.

DETAILED DESCRIPTION OF PREFERRED EMBODIMENT(S)

Figure 3:
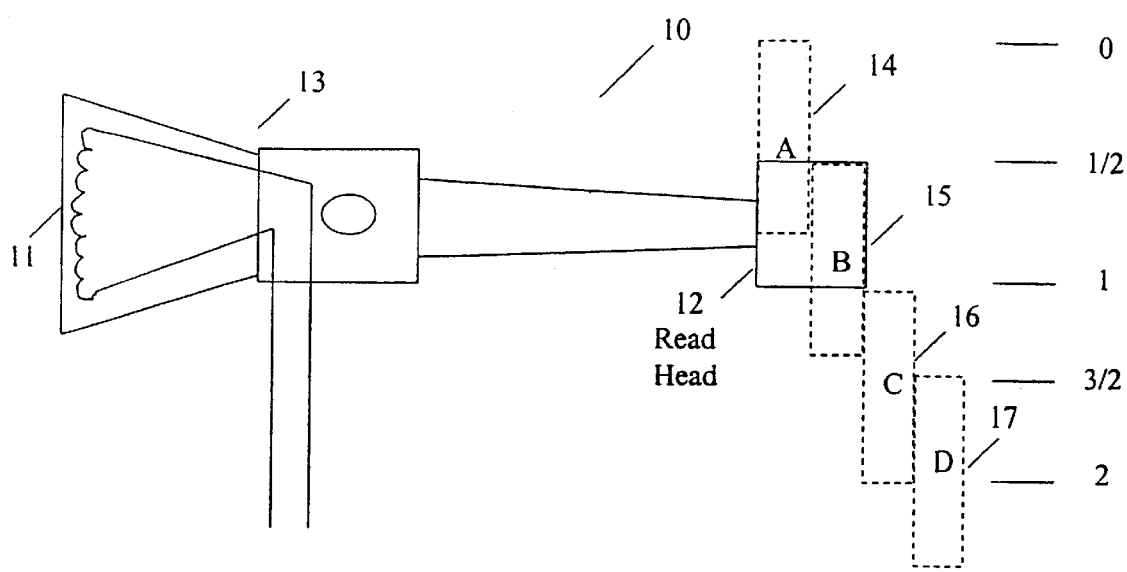
FIG. 3 illustrates a PES linearization system provided in accordance with the principles of this invention.
Figure 4:
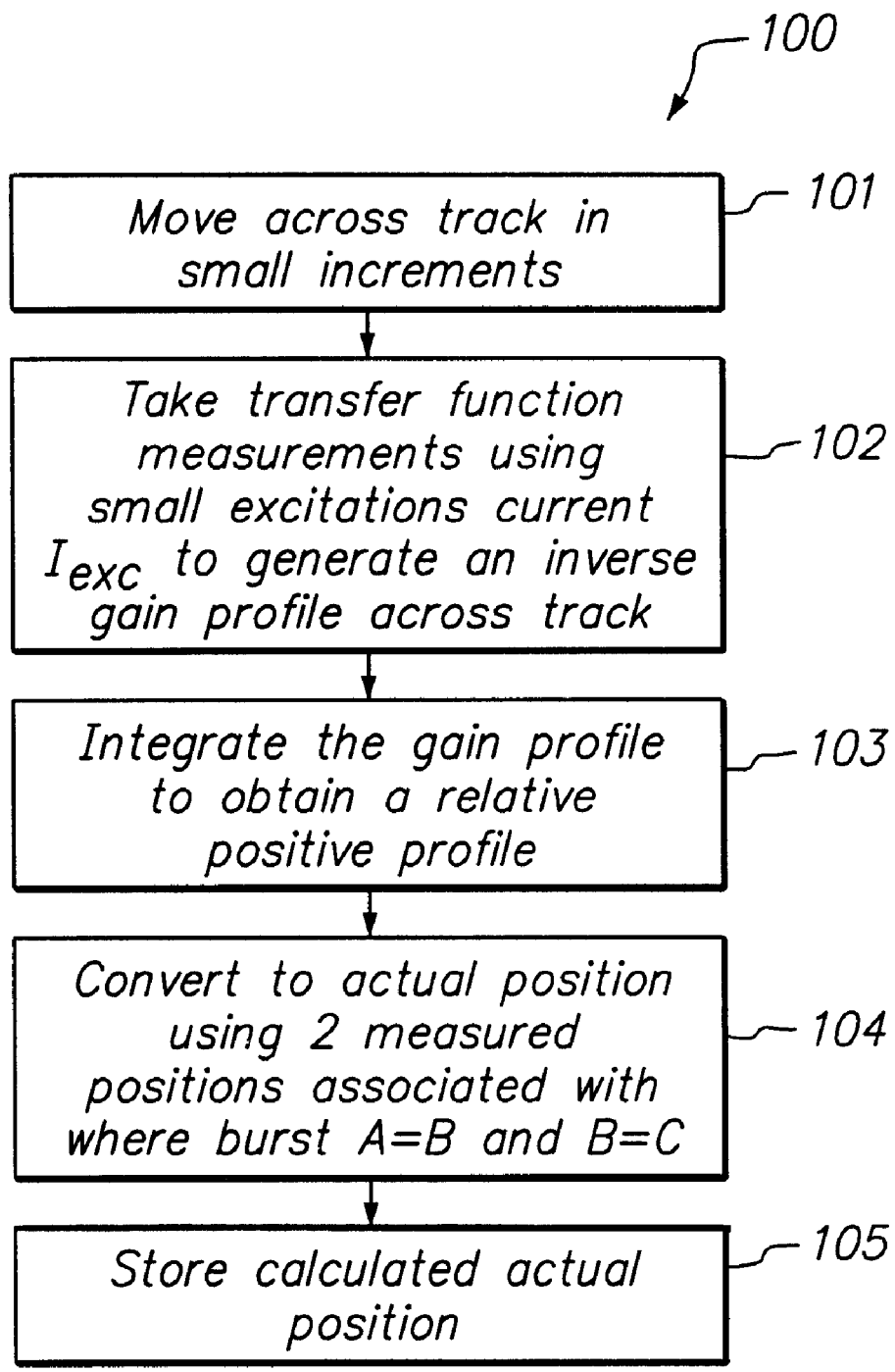
FIG. 4 illustrates a flowchart of a PES linearization method for positional data in accordance with the principles of this invention

FIG. 3 illustrates a PES linearization system provided in accordance with the principles of this invention. FIG. 4. illustrates a flow diagram of a PES linearization method 100 for operating PES linarization system 10 of FIG. 3 in accordance with the principles of this invention. In step 101, a sinusoidal electrical current $I_{exc}$ is injected into a rotator coil 11 of head element 12 at a frequency $f$ and at a sufficient amplitude to cause a corresponding small movement x of head element 12 at preferably about 2–3% of track distance. Head element 12 is thus moved across a track of a storage device (not shown), such as a disk drive, in small increments while measuring the transfer function from excitation current to measured burst amplitude difference at frequency f using a Discrete Fourier Transform (DFT), wherein $$\frac{\Delta(A-C)}{\Delta I_{exc}} = \frac{\partial(A(k)-C(k))}{\partial I_{exc}(k)}\bigg|_{k=NfT} \quad \text{Eqn. 1}$$

where f=frequency of excitation current

N=number of sample points

T=sample time

If $$\frac{\Delta(A-C)}{\Delta I_{exc}}$$

from Eqn 1 is described as the gain, then the inverse gain is:

$$\text{Inverse gain} = \frac{\Delta I_{exc}}{\Delta(A - C)} \qquad \text{Eqn. 2}$$

Since the distance the head moves is proportional to the excitation current, substitute $k\Delta x$ for $\Delta I_{exc}$, then $$\text{Inverse gain} = \frac{k\Delta x}{\Delta(A - C)} \qquad \text{Eqn. 3}$$

with x equivalent to actual head position of head element 12.

Figure 5:
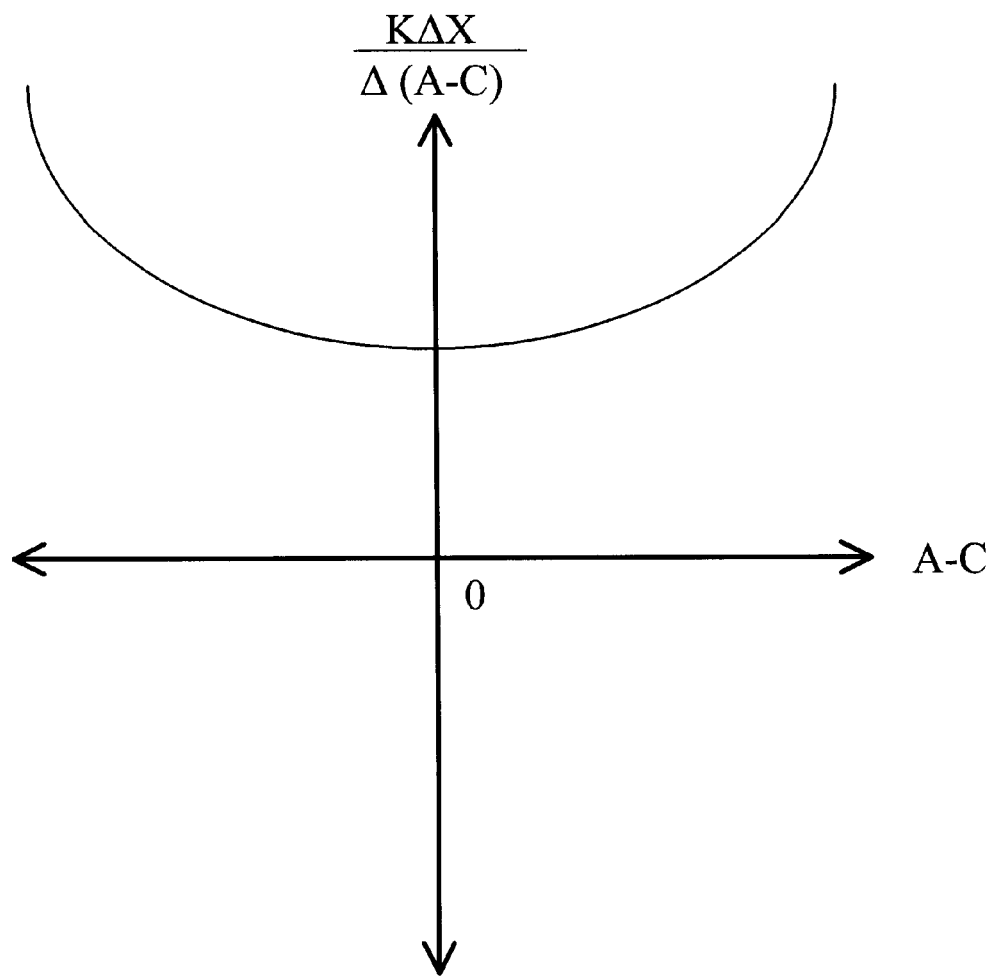
FIG. 5 illustrates a graphical representation of measurements made by a head element assembly of FIG. 3 relative to measured head position $x_m$.
Figure 6:
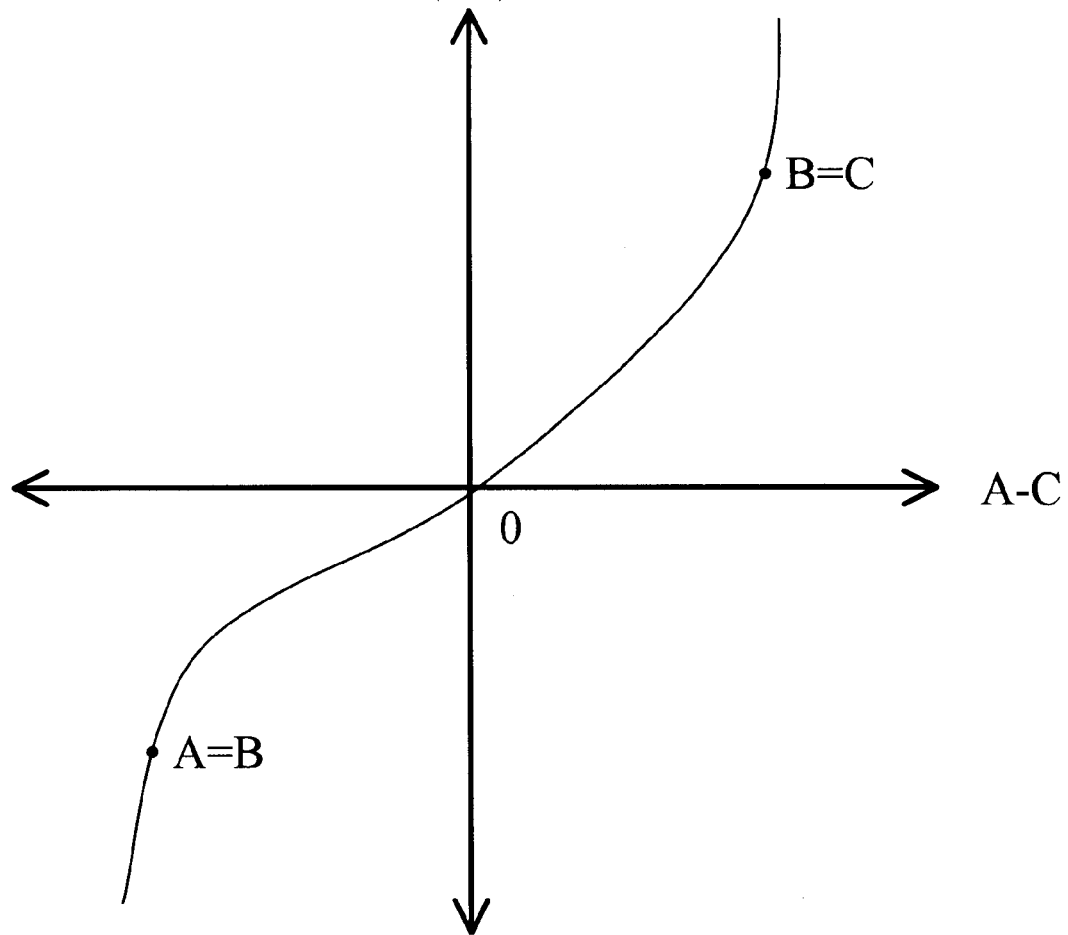
FIG. 6 illustrates a graphical representation of an integration of function illustrated in FIG. 5.

Thus, head element 12 is repeatedly moved in small increment radially across a center point where bursts A equally overlaps C (i.e., track center 0) while a transfer function measurement (Eqn. 1) is made at each corresponding small incremental position. FIG. 5 illustrates a resulting graphical representation of a set of such resulting measurements. This set of measurements is referred to as the inverse gain profile. Then as illustrated in FIG. 6, an integration of the inverse gain profile generates a relative position profile. Since the function illustrated in FIG. 4 is a discrete series, use a summation to approximate the integration $$kx = \sum \left( \frac{k\Delta x}{\Delta(A - C)} * \Delta(A - C) \right) \qquad \text{Eqn. 4}$$

Specifically, this summation can take the form of a trapezoidal approximation to the integral:

$$kx_{n+1} = \qquad \text{Eqn. 5}$$
$$kx_n + \frac{1}{2}\left( \frac{k\Delta x_n}{\Delta(A - C)_n} + \frac{k\Delta x_{n+1}}{\Delta(A - C)_{n+1}} \right) * ((A - C)_{n+1} - (A - C)_n)$$

To convert relative position to actual position, solve for k. Two reference points of known distance apart are selected. Because the bursts are written by the servo writer at exactly one half track intervals, the distance from where A equals B to where B equals C for the burst pattern as shown in FIG. 3 is known to be exactly one half track. This can be expressed as:

$$kx(B = C) - kx(A = B) = \frac{1}{2} \qquad \text{Eqn. 6}$$

Figure 1:
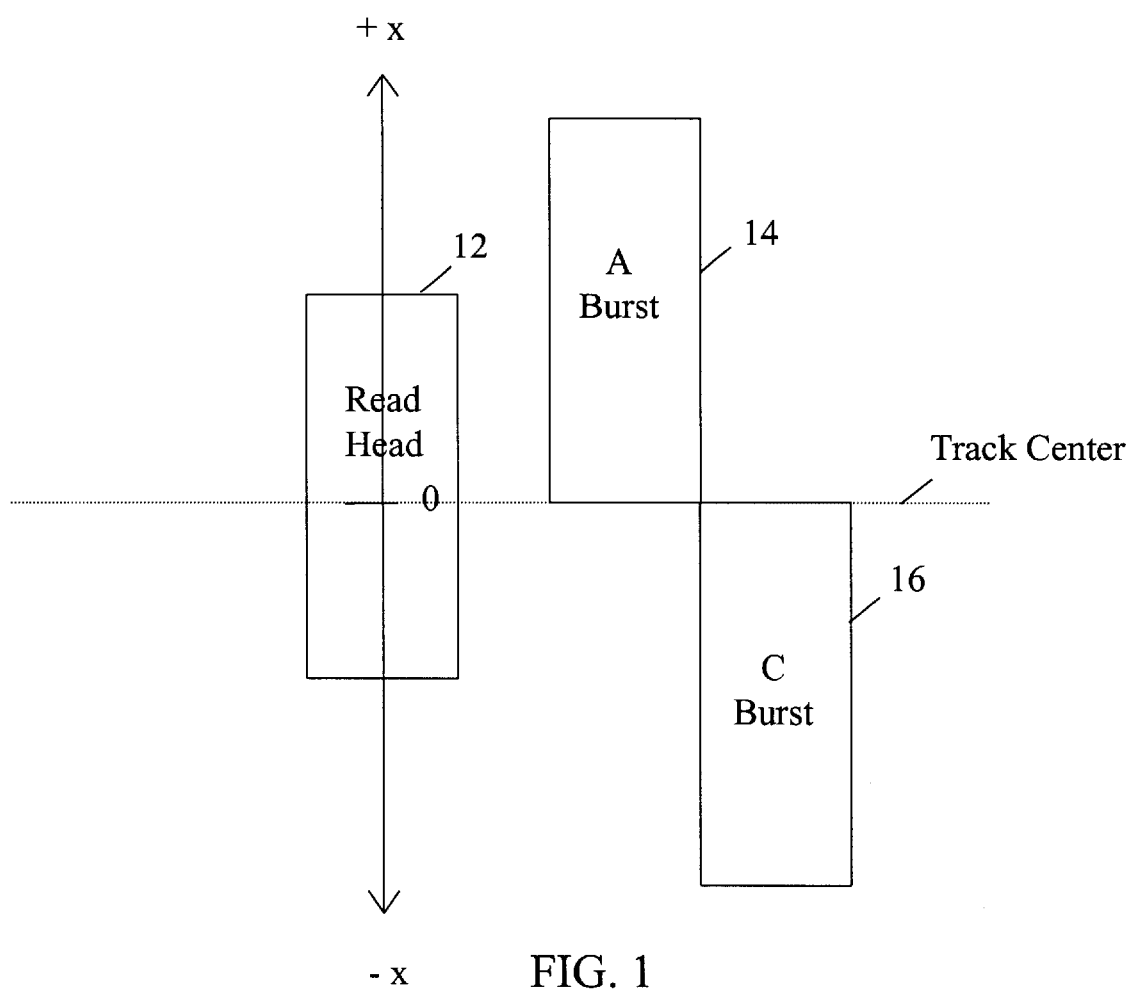
FIG. 1 illustrates prior art head element positions relative to a previously written and stored burst pattern.
Figure 2A:
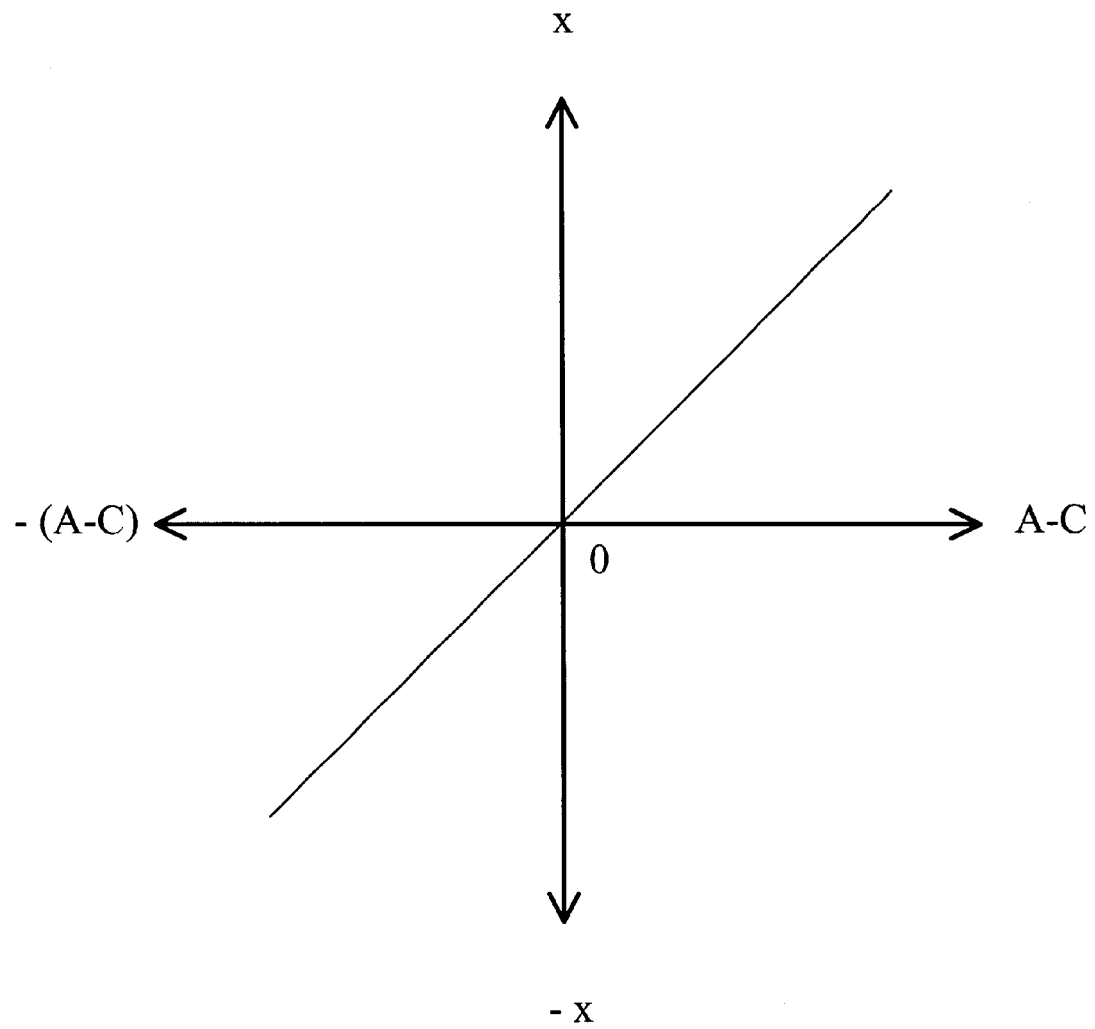
FIG. 2A illustrates prior art graphical representation of a linear relationship from measured burst amplitude difference (A–C) to head position x.
Figure 2B:
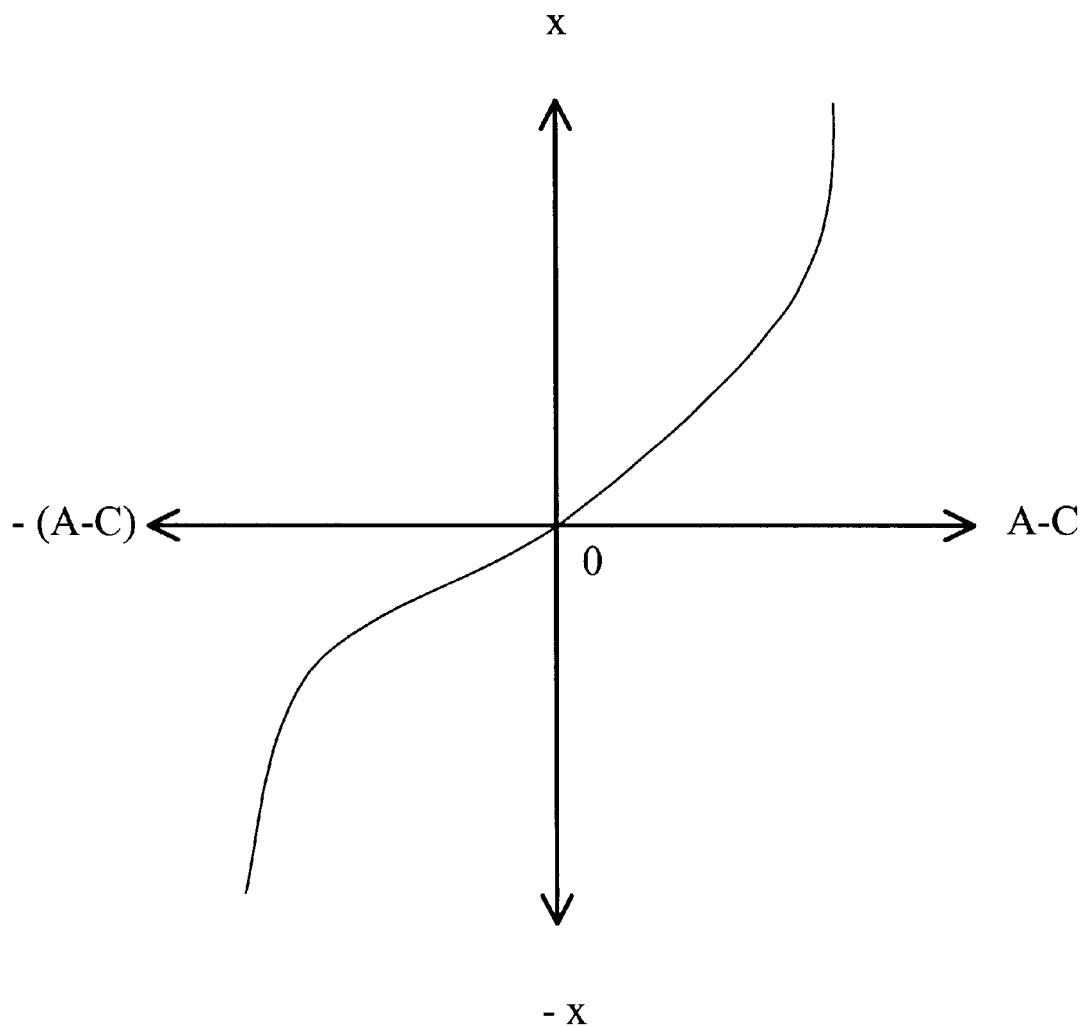
FIG. 2B illustrates a prior art graphical representation of a non-linear relationship from measured burst amplitude difference (A–C) to head position

Solve for k to generate a table which translates from burst amplitude difference to actual position as shown in FIG. 2B. The profile measurements are preferably done during the manufacturing process. A table of actual positions vs. burst amplitude differences calculated for each head is then written into one or more lookup tables stored in the system cylinders of the drive. These lookup tables are then read back from the system cylinders during the power-up stage of the drive. To determine a position to move head element 12, the head element 12 senses the burst values, then the drive firmware looks up the result in the appropriate lookup table and interpolates between two consecutive entries.

One advantage of PES linearization scheme of this invention over schemes that do not linearize is unlike methods which use a smaller region of the head profile to reduce the amount of non-linearity, this scheme measures and accounts for the non-linearity. The, result is less error in position measurement, less error in the servo loop gain, and smaller discontinuities between quadrant boundaries. Being able to use servo bursts outside of their linear region makes it possible to consider a wider range of PES including schemes which use all four bursts to determine position.

Foregoing described embodiments of the invention are provided as illustrations and descriptions. They are not intended to limit the invention to precise form described. In particular, it is contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by claims following.

What is claimed is:

1. A PES linearization method for a disk drive head assembly that includes a head element, the method comprising:

injecting a current through a rotator coil of the disk drive head assembly;

moving repeatedly the head element at increments across a track of a storage medium, and associated with each increment, taking a transfer function measurement using the head element to generate an inverse gain profile of burst signals across the track;

integrating the inverse gain profile to obtain a relative position profile; and converting the relative position profile to a set of actual position values using two known positional data associated with a pair of center values associated with a pair of burst values.

2. The PES linearization method of claim 1, further comprising storing a set of positional profile measurements associated with the relative position profile in a lookup table.

3. The PES linearization method of claim 2, further comprising obtaining the set positional profile measurements during a manufacturing process.

4. The PES linearization method of claim 2, wherein the set of positional profile measurements are written to a lookup table in a system cylinder of a disk drive that contains the disk drive head assembly.

5. The PES linearization method of claim 4, wherein the lookup table is read back during a power-up sequence of the disk drive.

6. The PES linearization method of claim 2, further comprising taking a head element position measurement relative to the pair of burst values, and then determining an appropriate position measurement via interpolation in the lookup table to obtain a corresponding absolute value.

7. The PES linearization method of claim 2, wherein the storage medium comprises a disk.

8. In a disk drive including a head assembly and a storage disk, wherein the head assembly includes a rotator coil and a head for transferring information to and from the disk, and the disk includes servo bursts, a method for calculating a position error signal (PES) profile for positioning the head, the method comprising:

injecting excitation current into the rotator coil to radially position the head relative to the disk in proportion to the excitation current;

reading amplitudes of the servo bursts using the head;

calculating an inverse gain profile based on the amplitudes and the excitation current;

integrating the inverse gain profile to obtain a relative position profile; and converting the relative position profile to the PES profile using positional data related to the servo bursts.

9. The method of claim 8, wherein the excitation current has a sinusoidal waveform.

10. The method of claim 8, wherein the the excitation current radially positions the head at incremental positions that are about 2–3% of a track distance.

11. The method of claim 8, wherein the inverse gain profile includes a ratio of the excitation current divided by a difference in the amplitudes of the bursts.

12. The method of claim 8, wherein integrating the inverse gain profile includes summing a discrete series of the inverse gain profile.

13. The method of claim 8, wherein converting the relative position profile includes multiplying the relative position profile by a gain factor based on the positional data.

14. The method of claim 8, wherein the positional data consists of two reference points separated by a known distance.

15. The method of claim 14, wherein the known distance is a radial distance between a first radial location where the amplitudes of two of the servo bursts are equal and a second radial location where the amplitudes of two of the servo bursts are equal.

16. The method of claim 15, wherein the known distance is one half a track width.

17. The method of claim 8, wherein the PES profile is calculated during manufacture of the disk drive.

18. The method of claim 17, wherein the PES profile is stored on a system cylinder of the disk drive.

19. The method of claim 17, wherein the PES profile is adapted for generating position error signals to be used by a servo system during read and write operations in the disk drive in response to differences in the amplitudes of the servo bursts detected by the head.

20. In a disk drive including a head assembly and a storage disk, wherein the head assembly includes a rotator coil and a head for transferring information to and from the disk, and the disk includes servo bursts, a method for calculating a position error signal (PES) profile for positioning the head, wherein the PES profile is adapted for generating position error signals to be used by a servo system during read and write operations in the disk drive in response to differences in the amplitudes of the servo bursts detected by the head, the method comprising:

injecting excitation current into the rotator coil to radially position the head relative to the disk in proportion to the excitation current;

reading amplitudes of the servo bursts using the head;

calculating an inverse gain profile based on the amplitudes and the excitation current;

integrating the inverse gain profile to obtain a relative position profile; and converting the relative position profile to the PES profile using positional data related to the servo bursts.

* * * * *